US008837328B2

(12) United States Patent
Cherian (10) Patent No.: US 8,837,328 B2
(45) Date of Patent: Sep. 16, 2014

(54) SYSTEMS AND METHODS FOR PRE-ASSOCIATION DISCOVERY OF SERVICES ON A NETWORK (71) Applicant: QUALCOMM Incorporated, San Diego, CA (US)

(72) Inventor: George Cherian, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 14/160,457

(22) Filed: Jan. 21, 2014

(65) Prior Publication Data

US 2014/0204826 A1 Jul. 24, 2014

Related U.S. Application Data (60) Provisional application No. 61/755,757, filed on Jan. 23, 2013.

(51) Int. Cl.
*H04L 12/28* (2006.01)
*H04W 72/00* (2009.01)
*H04W 4/06* (2009.01)

(52) U.S. Cl.
CPC .............. *H04W 4/06* (2013.01); *H04W 72/005* (2013.01)
USPC ...................................................... 370/255

(58) Field of Classification Search
USPC ......... 370/203, 204–215, 229–240, 310–337, 370/338–350, 351–394, 395.1, 395.3, 370/395.4, 395.41, 395.42, 395.5, 395.52, 370/431–457, 458–463, 464–497, 498–529
See application file for complete search history.

(56) References Cited

U.S. PATENT DOCUMENTS 6,850,743 B2 2/2005 Davis et al.
2006/0036733 A1* 2/2006 Fujimoto et al. .............. 709/225
(Continued)

FOREIGN PATENT DOCUMENTS

EP 2424281 A1 2/2012
WO WO-03093951 A2 11/2003
WO WO-2006120533 A2 11/2006

OTHER PUBLICATIONS

802.11-2012—IEEE Standard for Information technology—Telecommunications and information exchange between systems Local and metropolitan area networks—Specific requirements Part 11: Wireless LAN Medium Access Control (MAC) and Physical Layer (PHY) Specifications, Amendment 9: Interworking with External Networks;Amend 11 , IEEE Standard, IEEE, Piscataway, NJ' USA, Feb. 25, 2011. pp. 1-208, XP017694851.
(Continued)

*Primary Examiner* — Jung-Jen Liu
(74) *Attorney, Agent, or Firm* — Knobbe, Martens, Olson & Bear, LLP (57) ABSTRACT Systems, methods, and devices for an access point for monitoring, caching, and advertising service information on a wireless network are disclosed. In one aspect, a method for an access point for monitoring, caching, and advertising service information on a wireless network is provided. The method includes collecting information regarding one or more services offered on the wireless network, the information being collected from messages transmitted between other access points and wireless devices. The method further includes storing in a memory a service description for the services offered on the wireless network based on the collected information. The method further includes receiving a first service query from a wireless device for services before the wireless device associating with the wireless network and, if the service description is contained within the memory, transmitting the service description from the memory to the wireless device indicating availability of the service in the wireless network.

27 Claims, 7 Drawing Sheets

(56) References Cited

U.S. PATENT DOCUMENTS

| | | |
|---|---|---|
| 2008/0080388 A1 | 4/2008 | Dean et al. |
| 2009/0031035 A1* | 1/2009 | Dharmaraju et al. ......... 709/230 |
| 2009/0245133 A1 | 10/2009 | Gupta et al. |
| 2010/0322171 A1 | 12/2010 | Dekorsy et al. |
| 2011/0173249 A1 | 7/2011 | Lee et al. |
| 2011/0242990 A1 | 10/2011 | Simonsson et al. |
| 2012/0026987 A1 | 2/2012 | Jain et al. |
| 2012/0076117 A1* | 3/2012 | Montemurro et al. ........ 370/338 |
| 2013/0039275 A1* | 2/2013 | Patil et al. ..................... 370/328 |
| 2013/0070644 A1* | 3/2013 | McCann et al. ............. 370/255 |
| 2013/0210434 A1 | 8/2013 | Dimou et al. |
| 2014/0022932 A1 | 1/2014 | Park et al. |
| 2014/0078896 A1 | 3/2014 | Prytz et al. |
| 2014/0079014 A1 | 3/2014 | Lee |

OTHER PUBLICATIONS

International Search Report and Written Opinion—PCT/US2014/012567—ISA/EPO—Jun. 4, 2014.

Meshkova E., et al., "A survey on resource discovery mechanisms, peer-to-peer and service discovery frameworks", Computer Networks, Elsevier Science Publishers B.V., Amsterdam, NL, vol. 52, No. 11, Aug. 8, 2008, pp. 2097-2128, XP022734751.

* cited by examiner

SYSTEMS AND METHODS FOR PRE-ASSOCIATION DISCOVERY OF SERVICES ON A NETWORK

CLAIM OF PRIORITY UNDER 35 U.S.C. §119

The present Application for Patent claims priority to Provisional Application No. 61/755,757 entitled "SYSTEMS AND METHODS FOR PRE-ASSOCIATION DISCOVERY OF SERVICES ON A NETWORK" filed Jan. 23, 2013, and assigned to the assignee hereof and hereby expressly incorporated by reference herein.

BACKGROUND

1. Field

The present application relates generally to wireless communications, and more specifically to systems, methods, and devices for pre-association discovery of services on a network.

2. Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g. circuit switching vs. packet switching), the type of physical media employed for transmission (e.g. wired vs. wireless), and the set of communication protocols used (e.g. Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

The devices in a wireless network may transmit/receive information between each other. In general, some devices may serve as access points (APs) for a network, which other devices may connect to access functions of the network. Different APs may offer varying services to devices connected to those APs. However, it may not be clear which services may be offered by an AP until a wireless device has connected to that AP. Thus, improved systems, methods and devices for pre-association discovery of services on a network are desired.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include improved paging for devices in a wireless network.

In some aspects, a method for an access point for monitoring, caching, and advertising service information on a wireless network is provided. The method includes collecting information regarding one or more services offered on the wireless network, the information being collected from messages transmitted between other access points and wireless devices. The method further includes storing in a memory a service description for the services offered on the wireless network based on the collected information. The method further includes receiving a first service query from a wireless device for services before the wireless device associating with the wireless network and, if the service description is contained within the memory, transmitting the service description from the memory to the wireless device indicating availability of the service in the wireless network.

In some aspects, a wireless communications device configured to act as an access point is disclosed. The device includes a receiver configured to collect information regarding one or more services offered on the wireless network, the information being collected from messages transmitted between other access points and wireless devices, store in a memory a service description for the services offered on the wireless network based on the collected information; receive a first service query from a wireless device for services before the wireless device associating with the wireless network, and a transmitter configured to, if the service description is contained within the memory, transmit the service description from the memory to the wireless device indicating availability of the service in the wireless network.

In some aspects, a wireless communications device configured to act as an access point is described. The device includes means for collecting information regarding one or more services offered on the wireless network, the information being collected from messages transmitted between other access points and wireless devices, means for storing in a memory a service description for the services offered on the wireless network based on the collected information, means for receiving a first service query from a wireless device for services before the wireless device associating with the wireless network, and means for transmitting, if the service description is contained within the memory, the service description from the memory to the wireless device indicating availability of the service in the wireless network.

In some aspects, a non-transitory computer storage that stores executable program instructions that direct a wireless communications device to perform a process is disclosed. The process includes collecting information regarding one or more services offered on the wireless network, the information being collected from messages transmitted between other access points and wireless devices, storing in a memory a service description for the services offered on the wireless network based on the collected information, receiving a first service query from a wireless device for services before the wireless device associating with the wireless network, and if the service description is contained within the memory, transmitting the service description from the memory to the wireless device indicating availability of the service in the wireless network.

DETAILED DESCRIPTION

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies may include various types of wireless local area networks (WLANs). A WLAN may be used to interconnect nearby devices together, employing widely used networking protocols. The various aspects described herein may apply to any communication standard, such as a wireless protocol.

In some aspects, wireless signals in a sub-gigahertz band may be transmitted according to the 802.11 ah protocol using orthogonal frequency-division multiplexing (OFDM), direct-sequence spread spectrum (DSSS) communications, a combination of OFDM and DSSS communications, or other schemes. Implementations of the 802.11 ah protocol may be used for sensors, metering, and smart grid networks. Advantageously, aspects of certain devices implementing the 802.11 ah protocol may consume less power than devices implementing other wireless protocols, and/or may be used to transmit wireless signals across a relatively long range, for example about one kilometer or longer.

In some implementations, a WLAN includes various devices which are the components that access the wireless network. For example, there may be two types of devices: access points ("APs") and clients (also referred to as stations, or "STAs"). In general, an AP may serve as a hub or base station for the WLAN and an STA serves as a user of the WLAN. For example, an STA may be a laptop computer, a personal digital assistant (PDA), a mobile phone, etc. In an example, an STA connects to an AP via a WiFi (e.g., IEEE 802.11 protocol such as 802.11ah) compliant wireless link to obtain general connectivity to the Internet or to other wide area networks. In some implementations an STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, certain of the devices described herein may implement the 802.11ah standard, for example. Such devices, whether used as an STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications.

Figure 1:
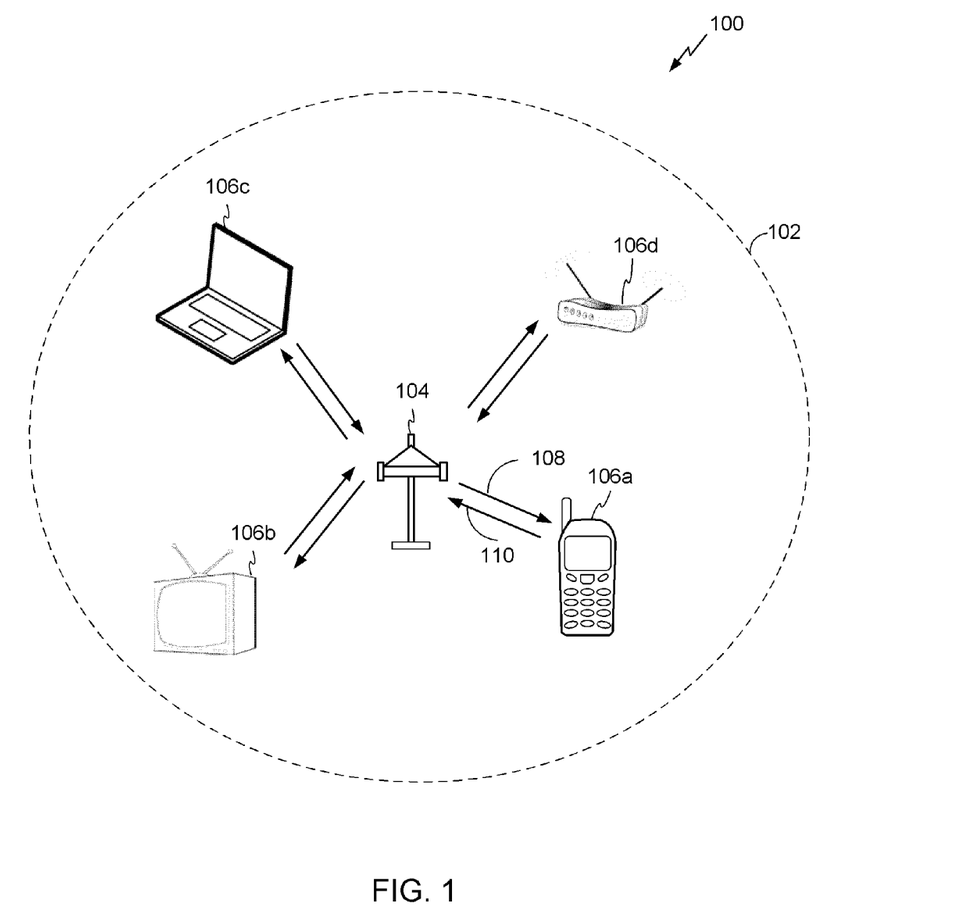
FIG. 1 shows an example wireless communication system in which aspects of the present disclosure may be employed.

FIG. 1 shows an example wireless communication system 100 in which aspects of the present disclosure may be employed. The wireless communication system 100 may operate pursuant to a wireless standard, for example the 802.11ah standard. The wireless communication system 100 may include an AP 104, which communicates with STAs 106.

A variety of processes and methods may be used for transmissions in the wireless communication system 100 between the AP 104 and the STAs 106. For example, signals may be sent and received between the AP 104 and the STAs 106 in accordance with OFDM/OFDMA techniques. If this is the case, the wireless communication system 100 may be referred to as an OFDM/OFDMA system. Alternatively, signals may be sent and received between the AP 104 and the STAs 106 in accordance with CDMA techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel.

The AP 104 may act as a base station and provide wireless communication coverage in a basic service area (BSA) 102. The AP 104 along with the STAs 106 associated with the AP 104 and that use the AP 104 for communication may be referred to as a basic service set (BSS). It should be noted that the wireless communication system 100 may not have a central AP 104, but rather may function as a peer-to-peer network between the STAs 106. Accordingly, the functions of the AP 104 described herein may alternatively be performed by one or more of the STAs 106.

The AP 104 may transmit a beacon signal (or simply a "beacon"), via a communication link such as the downlink 108, to other nodes STAs 106 of the system 100, which may help the other nodes STAs 106 to synchronize their timing with the AP 104, or which may provide other information or functionality. Such beacons may be transmitted periodically. In one aspect, the period between successive transmissions may be referred to as a superframe. Transmission of a beacon may be divided into a number of groups or intervals. In one aspect, the beacon may include, but is not limited to, such information as timestamp information to set a common clock, a peer-to-peer network identifier, a device identifier, capability information, a superframe duration, transmission direction information, reception direction information, a neighbor list, and/or an extended neighbor list, some of which are described in additional detail below. Thus, a beacon may include information both common (e.g. shared) amongst several devices, and information specific to a given device.

In some aspects, a STA 106 may be required to associate with the AP 104 in order to send communications to and/or receive communications from the AP 104. In one aspect, information for associating is included in a beacon broadcast by the AP 104. To receive such a beacon, the STA 106 may, for example, perform a broad coverage search over a coverage region. A search may also be performed by the STA 106 by sweeping a coverage region in a lighthouse fashion, for example. After receiving the information for associating, the STA 106 may transmit a reference signal, such as an association probe or request, to the AP 104. In some aspects, the AP 104 may use backhaul services, for example, to communicate with a larger network, such as the Internet or a public switched telephone network (PSTN).

Figure 2A:
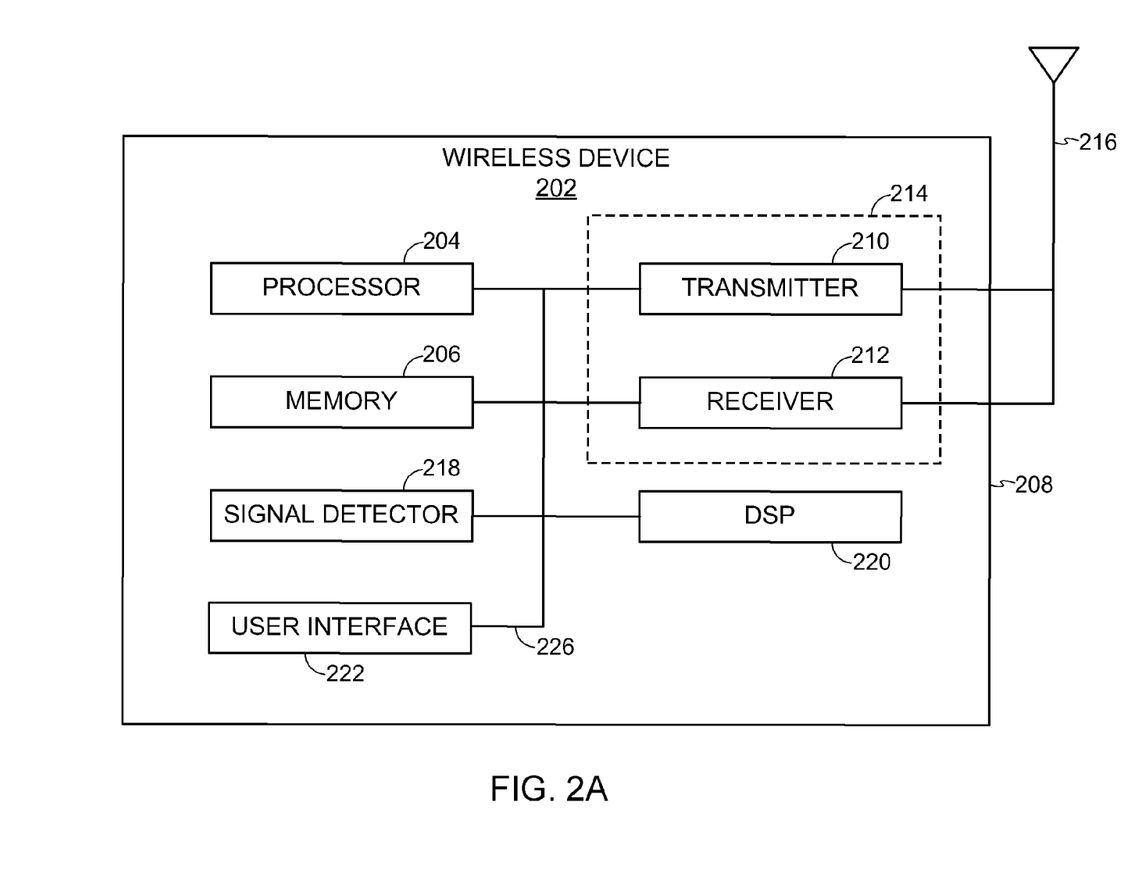
FIG. 2A shows a functional block diagram of an example wireless device that may be employed within the wireless communication system of FIG. 1.

FIG. 2A shows an example functional block diagram of a wireless device 202 that may be employed within the wireless communication system 100 of FIG. 1. The wireless device 202 is an example of a device that may be configured to implement the various methods described herein. For example, the wireless device 202 may comprise the AP 104 or one of the STAs 106.

The wireless device 202 may include a processor 204 which controls operation of the wireless device 202. The processor 204 may also be referred to as a central processing unit (CPU). Memory 206, which may include both read-only memory (ROM) and random access memory (RAM), may provide instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that may include a transmitter 210 and/or a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The transmitter 210 may be configured to wirelessly transmit messages, which may be referred to as "paging messages" that are configured to indicate to wireless devices whether or not the wireless devices need to wake up from a doze state and enter an awake state as discussed below. For example, the transmitter 210 may be configured to transmit paging messages generated by the processor 204, discussed above. When the wireless device 202 is implemented or used as a STA 106, the processor 204 may be configured to process paging messages. When the wireless device 202 is implemented or used as an AP 104, the processor 204 may also be configured to generate paging messages.

The receiver 212 may be configured to wirelessly receive paging messages.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a packet for transmission. In some aspects, the packet may comprise a physical layer data unit (PPDU).

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The various components of the wireless device 202 may be coupled together by a bus system 226. The bus system 226 may include a data bus, for example, as well as a power bus, a control signal bus, and a status signal bus in addition to the data bus. Those of skill in the art will appreciate the components of the wireless device 202 may be coupled together or accept or provide inputs to each other using some other mechanism.

Although a number of separate components are illustrated in FIG. 2A, one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2A may be implemented using a plurality of separate elements.

Figure 2B:
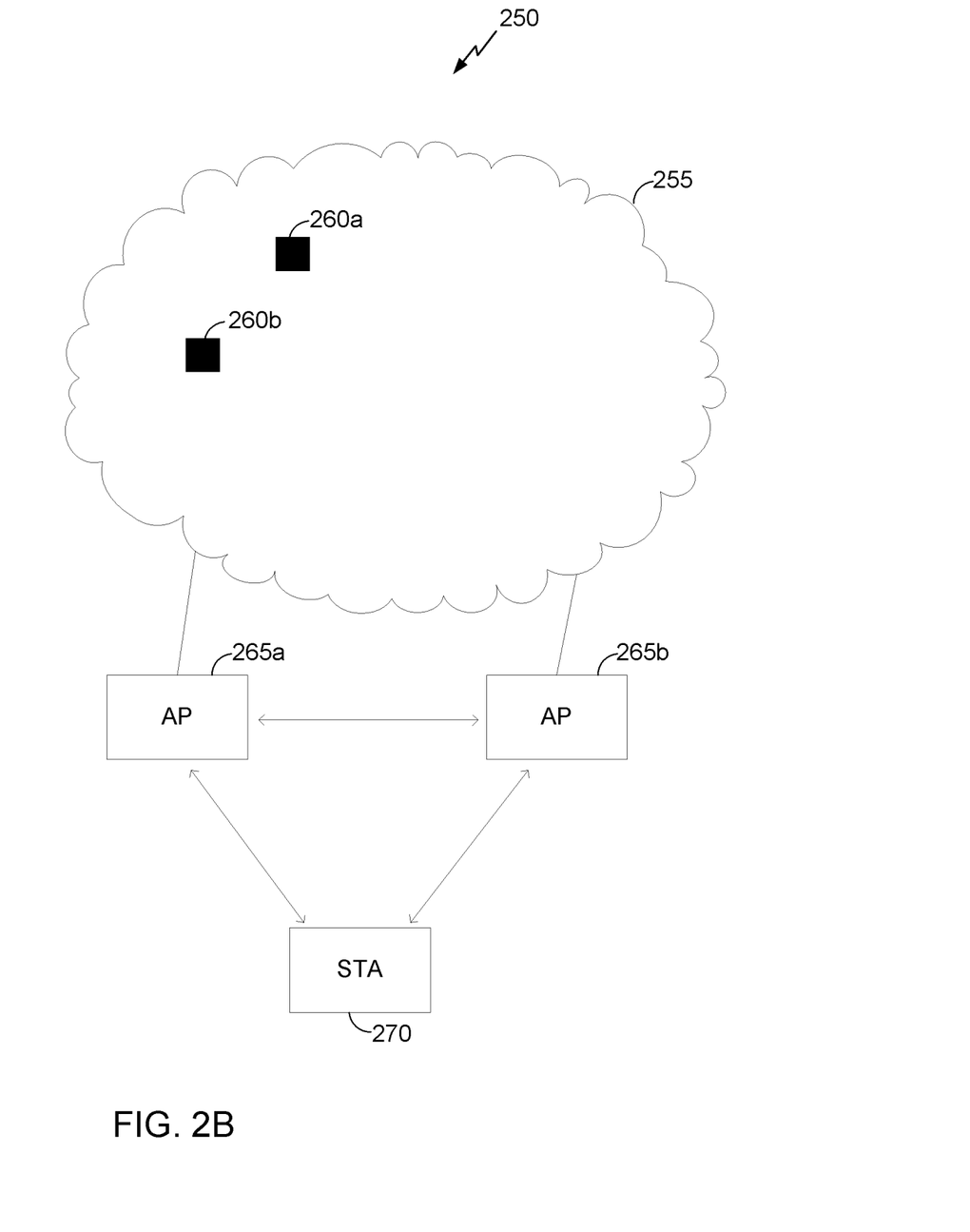
FIG. 2B is an illustration of a network including APs and a STA.

An AP 104 may offer a wide variety of services to a STA 106. For example, the AP 104 may offer specialized services, such as music streaming, games, or other types of services. These services may be offered on an ad hoc basis, and may vary with time. In any given network, different APs may offer different services to STAs connected to those APs. These services may be offered by the AP itself, in some instances, or by servers which are a part of a network that the AP is connected to. FIG. 2B is an illustration 250 of a network 255 including both APs 265a, 265b and a STA 270. This network 255 includes services 260a, 260b. In some aspects, different APs 265a, 265b may offer either the same services to STAs 270, or may offer different services to STAs. A STA 270 may be able to connect to two or more different APs 265a, 265b. Accordingly, since the STA 270 has options of which AP 265a, 265b to connect to, and these APs may offer different services, it would be preferable if the STA 270 could connect to an AP 265a, 265b offering the desired service, such as service 260a.

Because different APs may offer different services to STAs, it may be beneficial for a STA to be able to determine the services offered by an AP prior to becoming associated with that AP. For example, this may be especially useful when a STA is switching a connection from one AP to another. In a dense AP deployment, a STA may have two or more options of which AP to switch to. Accordingly, it would be beneficial if the STA could determine which services are offered by one or more of the APs, prior to switching to the network of that AP. This may be especially beneficial if a user of a STA is using a service over the current AP, and wishes to switch to another AP that allows continued, and potentially uninterrupted, use of the same service.

For example, a person may be carrying a STA, such as a cell phone, through a dense AP deployment, such as a shopping mall. This person may be listening to streaming music, using a music streaming service. This service may be offered on some networks, but not on others. For example, a person may be connected to one network, but may walk through the mall, such that other networks may offer much better service to the person's location. Thus, it may be advantageous for the person to switch to another network, such as another AP. Multiple APs may be available, such as APs offered by a number of different stores. Some of those APs may offer the music streaming service, while some of those APs may not offer the music streaming services. Accordingly, it would be beneficial if a STA could determine which APs offer the music streaming service prior to the STA becoming associated with the APs. With such a system, a STA may be able to switch from one AP to another but allow the person to continue using the music streaming service with minimal interruption.

One possible technology that may address service discovery is the Access Network Query Protocol (ANQP), which is a query and response protocol that can be used by a wireless device to discover a range of information that may be useful in the wireless device's selection process. However, ANQP may present problems of scalability, because the ANQP standard predefines which services will be communicated to a wireless device. For example, a user may download applications on a STA which require support from the AP infrastructure. Thus, the STA may want to find out the support of the application by a network prior to associating with that network. However, if these applications are not already predefined within the ANQP standard, the ANQP standard may not be useful for this situation. Thus, a STA may be unable to find out information about new services using the ANQP standard.

Similarly, other solutions also do not fully address this problem. For example, Bonjour or Universal Plug 'n Play (UPnP) can offer a listing of services available on an AP, but only to STAs which are already connected to that AP. These discovery services assume that a STA has an IP address assigned to it already, which is not the case for devices which are not associated with the network. Thus, services discovery using these protocols may require that a STA connect to an AP prior to knowing whether or not a given service is offered on that AP.

Accordingly, it would be beneficial for an AP to be able to provide to a STA a listing of one or more services offered on the AP's network, prior to the STA associating with the AP. The process for associating a STA and an AP has been described for example in 802.11 Standards. The process involves exchanges of one or more information and control data packets in accordance with the 802.11 Standards. In order to provide a STA with a listing of the available services in the network before the STA and the AP pass through the association process, an AP must be aware of the services which are offered on its network. For example, services may be offered by individual STAs which are connected to the AP, or by other devices on the network of the AP rather than on the AP itself. Thus, an AP may not always be aware of services offered on the APs network. In order to allow an AP to indicate to a STA which services are offered on the AP's network, an AP may cache a listing of services which are available on the AP's network. For example, this cached listing of services may include a service description for a given service, the identity of a device on the AP's network offering the service, an indication of the last known time at which that particular service was available, or a number of other possible information about the offered service.

In order to store such a listing of services, an AP may passively monitor certain messages which are transmitted on the network. For example, devices offering a service may transmit advertising messages on the network, which advertise the availability of a certain service. These messages may be sent periodically, or may be sent in response to requests from other devices on the network, asking for devices offering a certain service. Such exchanges of messages between the STA and AP may be in accordance with the processes formulated in the 802.11 Standards for transmission and reception of information and control data. The AP may monitor these messages, and may store information regarding the services offered on the network in a memory. For example, another STA on the network may send a request to another AP on the network inquiring whether a particular service is available. The AP may be configured to collect a response from that other AP, indicating that such a service is available through that AP. Similarly, other devices may also send information on the network, indicating that a particular service is available through a particular device on the network, or at a particular address. The AP may be configured to collect or passively monitor (for example, monitor without having to send out service request information itself) this service information. By storing information regarding the services offered on the network, the AP may be able to provide this information to STAs, prior to STAs connecting to the AP. In some aspects, the AP may also, from time to time, request information on services offered by devices on the network, and may store the responses to those requests within a cache.

Figure 3:
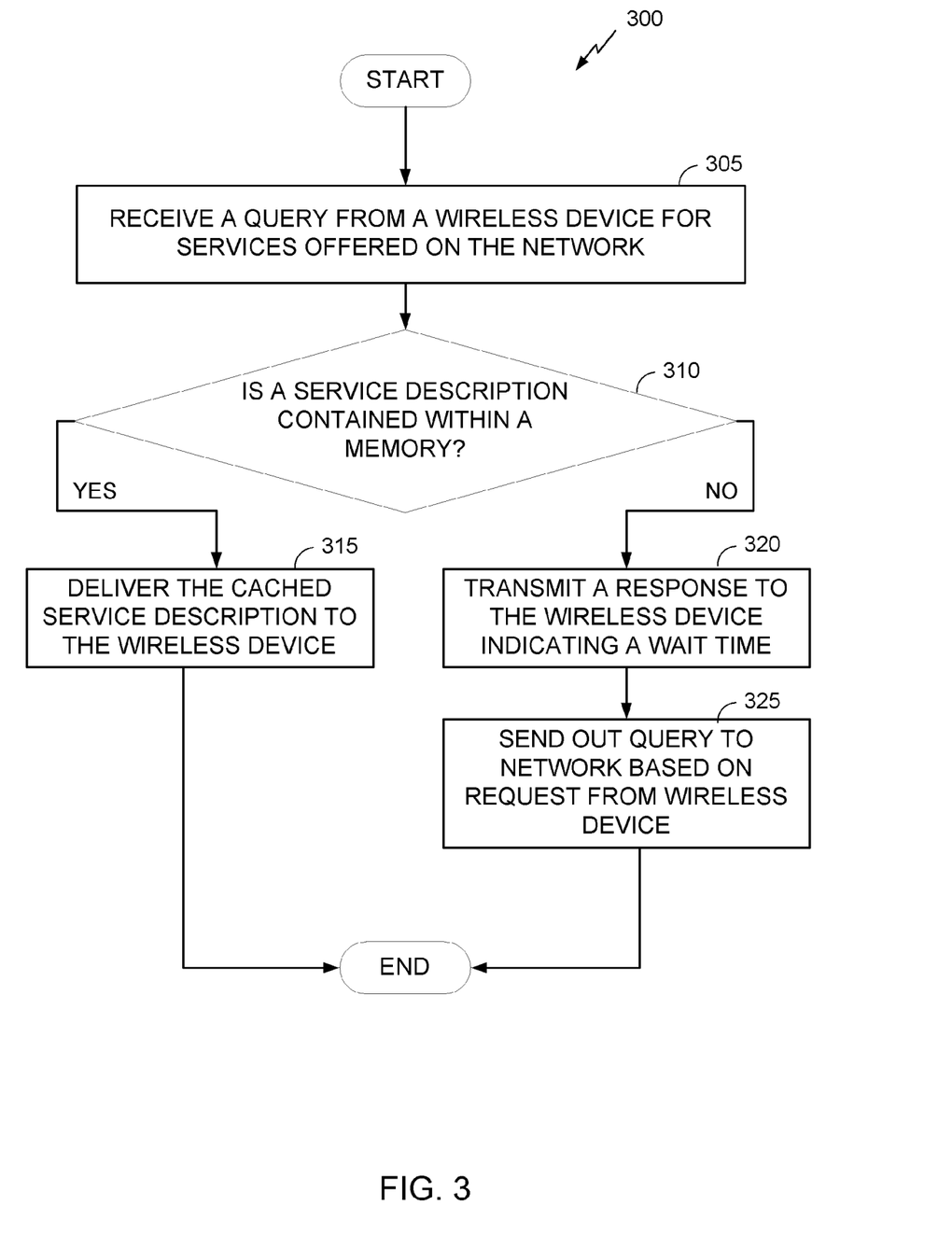
FIG. 3 is a flowchart of a method which allows an AP that caches service availability to provide information on services offered on the network to STAs which are not associated with the network.

FIG. 3 is a flowchart of a method which allows an AP that caches service availability to provide information on services offered on the network to STAs which are not associated with the network. This method may allow an AP to act as a proxy services discovery client to discover the services offered by different nodes, such as different APs, in the network.

At block 305, the AP receives a query from a wireless device, such as STA 106, for services offered by different nodes on the network. This query may be from a STA that is not yet associated with the AP. The query may specify one or more services which the STA is interested in. The query may be sent just to one AP, or may be multicast to a number of different APs. The query from a STA may take the form of a service discovery protocol packet using Generic Advertisement Service (GAS) frames, as defined in the Wi-Fi Alliance (WFA) peer-to-peer (P2P) specification. It may be necessary to expand this mechanism, however, in order to accommodate this type of request, as this mechanism may assume that the P2P device hosts the services directly on the device. Thus, an amended version of this mechanism may be used.

At block 310, the AP determines whether a service description is contained within a memory. For example, as discussed about, the AP may contain a cache of various services which are offered on the network. Thus, the AP may determine whether the service or services requested by the STA are offered on the network, based on information in the AP's cache. For example, the AP may compare service descriptions of services in the AP's cache with a service description contained in the STA's request. In some aspects, if the AP finds a matching service description in its cache, the AP may also determine how recently that cached service description has been updated. For example, the AP may determine whether that particular service has been advertised in the past minute, hour, day, or some other time period. This may prevent the AP from providing a STA with incorrect or inadequately updated information.

At block 315, if the AP has a cached service description relevant to the wireless device request, the AP may deliver the cached service description to the wireless device. For example, the service description may comprise a probe response frame.

At block 320, if the AP does not have a relevant cached service description, the AP may transmit a response to the wireless device indicating a wait time. At block 325, the AP may transmit a query to the network based on the request from the wireless device. For example, the wait time may be an estimation of the amount of time it may take the AP to determine whether a particular service is offered on the network. The query transmitted by the AP may be a query which requests information on whether any devices on the network offer the service requested by the STA. In some aspects, the STA may be configured to resubmit the same query to the AP after the wait time has elapsed, provided that the STA is still seeking the same service at that time. In some aspects, the request from the STA may be transmitted as a probe request frame, and the wait time may be transmitted as a probe response frame.

An AP which caches service availability may also be configured to advertise services available on the AP. These advertisements may be accessible to STAs which are not connected to the AP, and may be received directly by those STAs, in order to allow them to connect to a network offering certain services. These advertisements may also be received by other APs, which may cache information on the services offered, in order to respond to queries from STAs, as in method 300.

Advertisements of services on an AP may be included in a beacon frame or a probe response frame. These advertisements may contain a hash of the service description. For example, these advertisements may contain a 2-byte cyclic redundancy check (CRC) of the service description. When different APs are connected to a local subnet, the source of the service description may remain the same—the source will be the node that offers the service. Thus, the hash may also remain the same. However, in rare cases, the hash of two or more service descriptions may yield the same hash value. This may create a problem of collisions. In order to mitigate this problem, a tag that is associated with each service description may also be transmitted in the service response type-length value (TLV). For example, the tag may be the IP address or the MAC address of the host that advertises a service. In this embodiment, service response TLVs may be extended to include the address of the host. Similarly, an AP may advertise the address of the host that hosts a service in a beacon/probe response frame.

Similarly, a STA may cache a service description from its current AP, and compute the hash based on the service description. The STA may use this hash, at least in part, to determine which AP to handoff to. The STA may also associate each service description with the address of the host that transmits that service description. For example, if a STA is using a particular music streaming service, the STA may use a hash of that service's name or location, and may seek other APs which are connected to the same music streaming service.

In some embodiments, the AP may also cache the basic service set identification (BSSID) of other nodes in the network. The BSSID of other nodes in the network may also be available to other wireless devices on the network, if the wireless devices send a request to the AP. This information may be distributed to wireless devices in the service description sent to an AP in response to a query from the wireless device. This information may be requested or passively collected by the AP, in a manner similar to how the services available on other nodes are collected, cached, and distributed to wireless devices which request this information.

The use of such advertisements, such as beacon frames, may minimize the number of probe request frames and probe response frames that must be transmitted on the network. For example, if devices on the network are well-informed about what services are offered on the network due to such advertisement messages, a STA seeking a particular service may be able to find that service more easily and with fewer probe requests. For example, if a STA was unable to determine which services are available on a network prior to associate, the STA may have to associate sequentially with a number of different networks, request information on services on the network, receive responses to those requests, and repeat this process until the STA finds a network offering the requested services. However, if an AP can inform a STA which services are available prior to association, this may use much less network bandwidth and be faster than associating with each network individually. Similarly, an STA may be able to determine which services are available based upon transmitted advertisement beacon frames, and thus, may not need to send probe request frames.

Figure 4A:
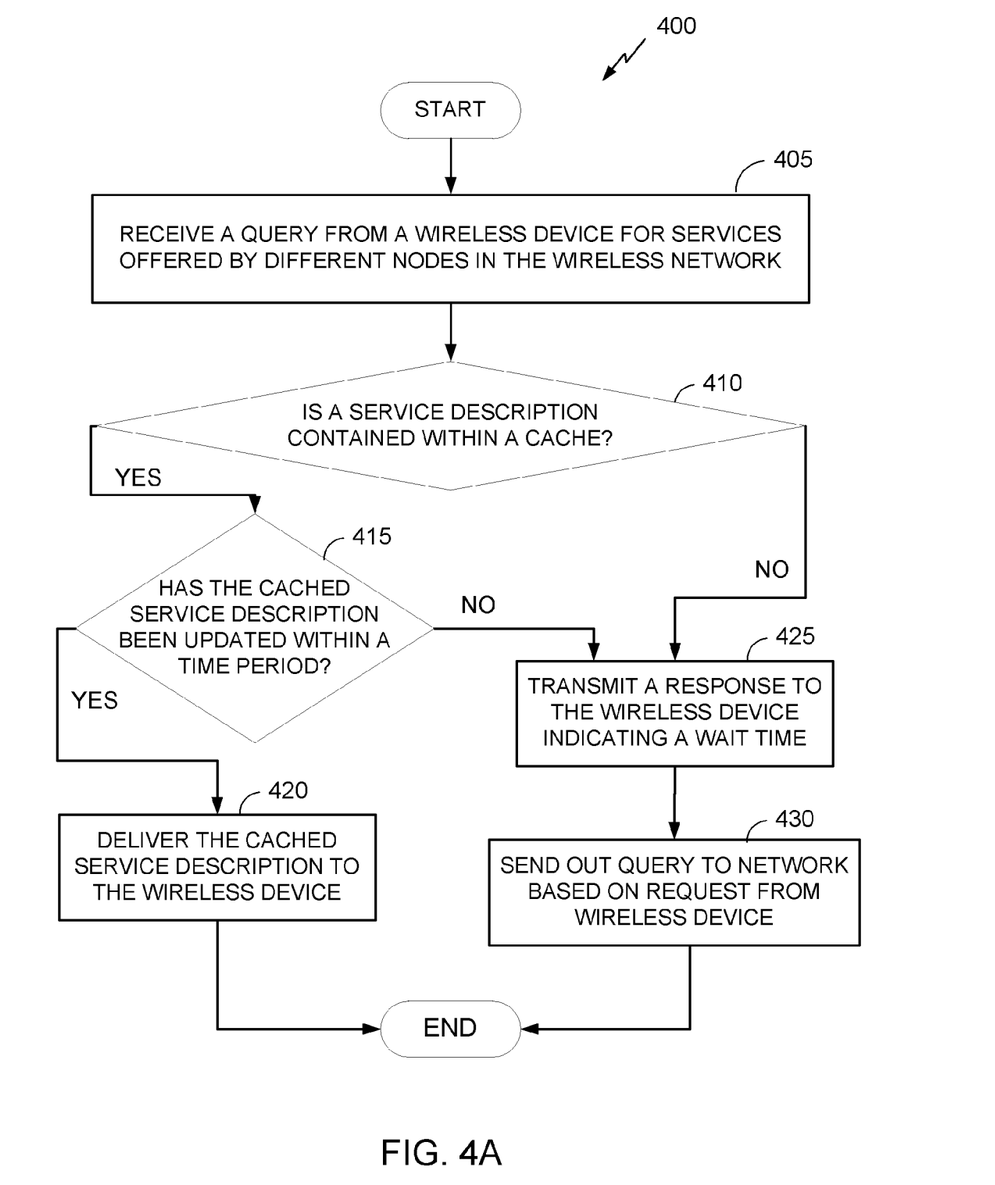
FIG. 4A is a flowchart of a method for allowing pre-association discovery of services on a network, which may be used on an AP.

FIG. 4A is a flowchart of a method for allowing pre-association discovery of services on a network, which may be used on an AP such as AP 104. This method may allow an AP to act as a proxy services discovery client to discover the services offered by different nodes, such as different APs, in the network.

At block 405, the AP receives a query from a wireless device for services offered by different nodes in the wireless network. In some aspects, the wireless device may be a STA, such as STA 106. In some aspects, the STA may be associated with or connected to the AP. In this query, the STA may specify one or more different nodes for which the STA would like to know what services are offered. Alternatively, the STA may not specify which node or nodes it is interested in, and may instead request a listing of services of all nodes that the AP is aware of. In this query, the STA may specify one or more services that the STA is interested in. Alternatively, the STA may also request a listing of all services offered by different nodes.

At block 410, the AP determines whether the service description is contained within a cache. For example, the AP may be configured to cache service descriptions for other nodes on the wireless network. These cached service descriptions may include an indication of how recent the service description is, as well as an indication of which node they are for and which services are offered or supported by that particular node.

At block 415, if the service description is contained within a cache, the AP determines whether the cached service description has been updated within a period of time. For example, the AP may determine whether a service description has been updated within a threshold period of time. For example, the AP may determine whether the cached service description has been updated in the past minute, hour, or day. The AP may use any period of time as a threshold for this purpose. The period of time used for this purpose may be predefined.

At block 420, if the cached service description has been updated within a period of time, the AP delivers the cache service description to the wireless device. For example, the service description may comprise a probe response frame. This probe response frame may comprise a service response TLV.

At block 425, if the service description is not contained within a cache or if the caches service description has not been updated within a time period, the AP transmits a response to the wireless device indicating a wait time. For example, the AP may transmit a response to the wireless device indicating a time in which the wireless device should wait before submitting another similar query to the AP. After this time has elapsed, the wireless device or STA may send another query to the AP. In some aspects, the transmission of a wait time to the wireless device may indicate a time after which the AP will transmit a service description to the wireless device. For example, the AP may be configured to transmit to a wireless device a certain wait time, and after this wait time has elapsed, to transmit to the wireless device either a service description or transmit to the wireless device another wait time. In some embodiments, the wait time may represent a maximum amount of time that the AP will take before transmitting further information to the wireless device regarding service discovery. For example, the AP may transmit to a wireless device that the AP will provide the wireless device with further information on services available on different nodes in a certain amount of time or less. This response from the AP may comprise a probe response frame, while the request from the wireless device may comprise a probe request frame.

At block 430, the AP sends out a query to the network based on the request from the wireless device. For example, the AP may send out a query to one or more nodes based on the request the AP received from the wireless device. These one or more requests may represent inquiries to one or more different nodes about the services offered by those nodes. In some aspects, when the AP receives a response to the one or more queries, the AP may be configured to forward the responses to the wireless device. In some aspects, the AP may not store a per-STA based state and the STA may need to come back with another request for services after the indicated wait time. The STA may come back to the network to fetch the service description after the indicated time. Alternatively, the AP may send it to the STA using a public action frame. In some aspects, the AP may broadcast the information after the wait-time if it has received the service description information from the network.

Figure 4B:
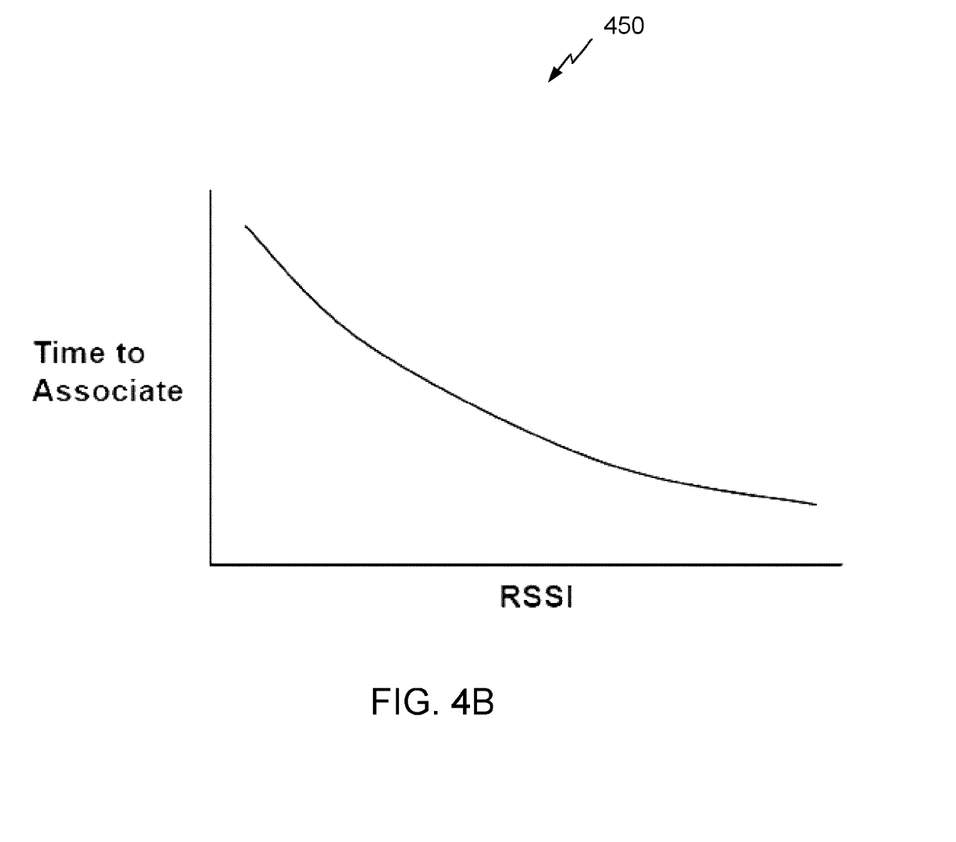
FIG. 4B is an illustration of an exemplary relationship between the time to associate an AP and STA and the received signal strength.

In some aspects, a STA may send a multicast query to a number of different APs, requesting information on which of the APs offers a particular service. For example, if a user is streaming music via a music streaming service, and the user's device wishes to switch to another AP (such as if the device is leaving the area of the current AP), that device may send a request to all nearby APs asking if those APs support the music streaming service. However, it may be beneficial if a limited number of APs respond. If each AP in the network responds to the query, this may unnecessarily increase network traffic. Thus, in some aspects, only a limited number of APs may respond. For example, APs may respond based upon whether or not they offer the service, only responding if they do offer the service. APs may also only respond if the signal strength of the STA is above a threshold, ensuring the STA receives a response from an AP with a certain signal strength. This may help reduce network traffic, although it may also mean that at certain times, a STA will not receive a response to its query. This may also enable STAs to find APs which offer the desired service, but which have high signal strength. In some aspects, higher signal strength may allow a STA to associate more quickly with the AP, and may thus allow services, such as a music streaming service, to be interrupted minimally while a user's wireless device switches from one network to another. FIG. 4B is an illustration 450 of an exemplary time to associate as related to a signal strength. As illustrated in this illustration, the signal strength may be a received signal strength indication (RSSI). In some aspects, the higher the RSSI (that is, the stronger the signal between the AP and the STA), the lower the time to associate between the two devices may be. Accordingly, it is advantageous for a STA to associate with an AP that has higher signal strength.

In some aspects, if the STA does not receive a response to its query, the STA may be configured to transmit the query again. This second query may contain an indication that it is a second query. APs may be able to observe that the query is a second query based on either an indication in the query, or based on having previously received a similar query from the same device. In some aspects, APs may be configured to be more likely to respond to a second query. For example, APs may use a less restrictive threshold signal strength for second queries, or may respond to all second queries where the AP offers the requested service.

Figure 5:
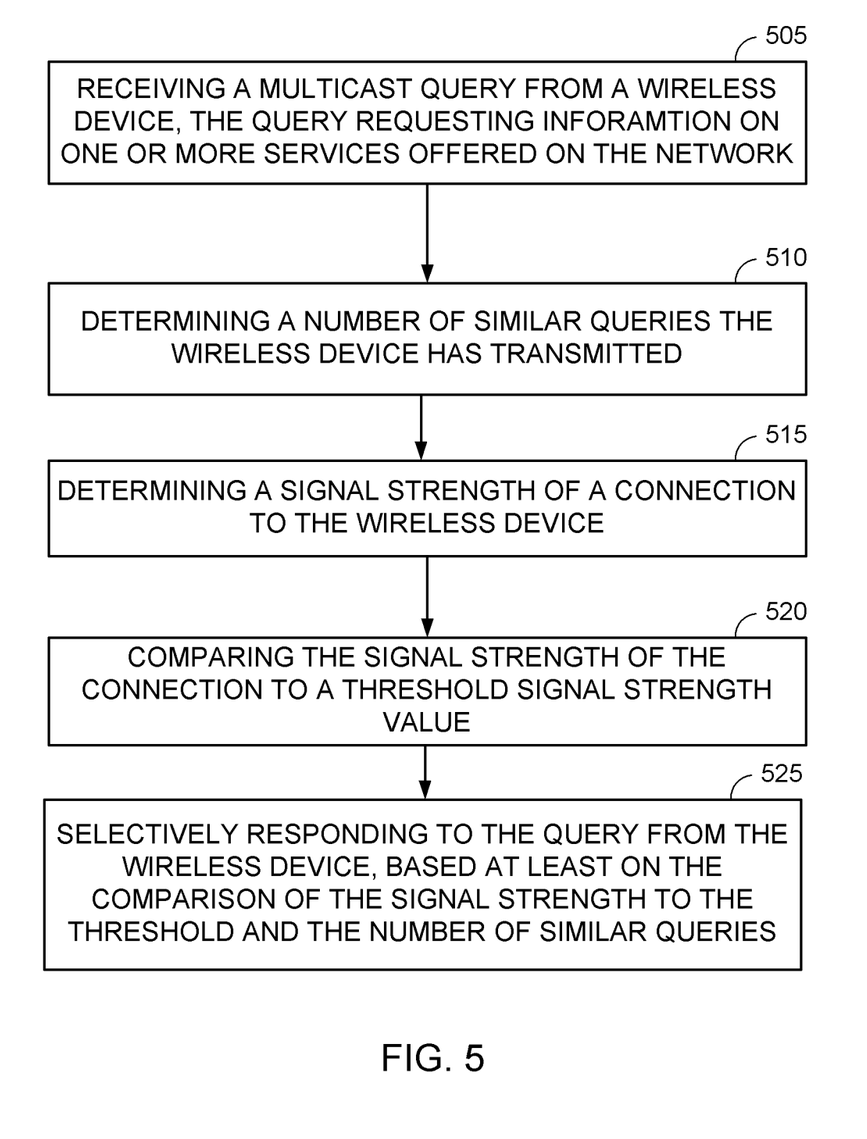
FIG. 5 is an illustration 500 of a method of selectively responding to a query from a wireless device regarding services available on a network.

FIG. 5 is an illustration 500 of a method of selectively responding to a query from a wireless device regarding services available on a network. This method may be done by an STA such as AP 104. This method may be used to reduce network traffic by limiting the number of APs which respond to a particular multicast query inquiring about services on the network.

At block 505, the AP receives a multicast query from a wireless device, the query requesting information on one or more services offered on the network. The query may be multicast to two or more wireless device. The query may indicate a specific service that the wireless device is interested in. For example, this indication may be in the form of a hash value, as discussed above.

At block 510, the AP determines a number of similar queries the wireless device has transmitted. For example, the AP may determine how many times the wireless device has transmitted an identical query within a particular time frame. In some aspects, the query itself may include information on how many times the wireless device has transmitted the query. For example, the query may indicate that it is a first query, a second query, and so on.

At block 515, the AP determines a signal strength of a connection to the wireless device. This signal strength may be based upon the signal strength of the query itself, or based on other messages the AP has received from the wireless device. In some aspects, the signal strength may be a received signal strength indication (RSSI).

At block 520, the AP compares the signal strength to a threshold signal strength value. This threshold signal strength value may be based, at least in part, on how many similar queries the wireless device has transmitted. For example, the threshold signal strength value may be such that the AP will respond to a weak signal strength query on a second or subsequent query than it would on a first query. The threshold signal strength value may be a dynamic threshold, based on, for example, the number of APs in a particular area, the number of times which wireless devices have had to re-send queries in the past, and other factors. For example, if the AP observes that most wireless devices have to transmit two or more similar queries before receiving a response, the AP may alter its thresholds so that it is more likely to respond to queries.

At block 525, the AP selectively responds to the query from the wireless device, based at least in part on the comparison of the signal strength to the threshold, and based on the number of similar queries. In some aspects, the AP may only respond if it offers the one or more services requested by the wireless device, or is connected to other devices which offer those services. In some aspects, the AP may respond to a request if a certain number of similar queries have been made, regardless of the threshold. For example, the AP may be configured to always respond to second or third requests, regardless of the signal strength of the requesting device and the threshold.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method for an access point for monitoring, caching, and advertising service information on a wireless network, the method comprising:
   collecting information regarding one or more services offered on the wireless network, the information being collected from messages transmitted between other access points and wireless devices;
   storing in a memory a service description for the services offered on the wireless network based on the collected information;
   receiving a first service query from a wireless device for services before the wireless device associating with the wireless network;
   if the service description is contained within the memory, transmitting the service description from the memory to the wireless device indicating availability of the service in the wireless network; and
   transmitting a multicast advertising message, the advertising message containing the collected information on one or more services offered on the wireless network, the advertising message further configured to allow wireless devices to determine which services are offered on the network prior to associating with the wireless network.

2. The method of claim 1 further comprising:
   if the service description is not contained within the memory, transmitting a response to the wireless device indicating a wait time; and
   sending a second service query to the network, based on the received first service query.

3. The method of claim 2, wherein the second service query is a multicast service query.

4. The method of claim 2, further comprising:
   receiving a response to the second service query, the response containing a received service description which is the same or related to the service description provided in the first service query; and
   after the wait time, transmitting the received service description to the wireless device indicating availability of the service in the wireless network.

5. The method of claim 1, wherein transmitting the service description from the memory to the wireless device is further conditioned on whether the service description has been updated in the memory within a time period less than a threshold value.

6. The method of claim 1, wherein the information on one or more services offered on the wireless network comprises one or more hash functions which identify one or more services offered on the wireless network.

7. The method of claim 6, wherein the one or more hash functions comprise a hash function based, at least in part, on an address of a server offering the service on the wireless network.

8. The method of claim 1, wherein the monitoring of the messages is performed passively without a direct interaction between the access point and other access points or other wireless devices.

9. A wireless communications device configured to act as an access point, the device comprising:
   a receiver configured to:
      collect information regarding one or more services offered on the wireless network, the information being collected from messages transmitted between other access points and wireless devices;
      store in a memory a service description for the services offered on the wireless network based on the collected information;
      receive a first service query from a wireless device for services before the wireless device associating with the wireless network;
   a transmitter configured to, if the service description is contained within the memory, transmit the service description from the memory to the wireless device indicating availability of the service in the wireless network; and
   the transmitter further configured to transmit a multicast advertising message, the advertising message containing the collected information on one or more services offered on the wireless network, the advertising message further configured to allow wireless devices to determine which services are offered on the network prior to associating with the wireless network.

10. The device of claim 9, the transmitted further configured to:
- if the service description is not contained within the memory, transmit a response to the wireless device indicating a wait time; and
- send a second service query to the network, based on the received first service query.

11. The device of claim 10, wherein the second service query is a multicast service query.

12. The device of claim 10, further comprising:
- the receiver further configured to receive a response to the second service query, the response containing a received service description which is the same or related to the service description provided in the first service query; and
- the transmitter further configured to, after the wait time, transmit the received service description to the wireless device indicating availability of the service in the wireless network.

13. The device of claim 9, wherein transmitting the service description from the memory to the wireless device is further conditioned on whether the service description has been updated in the memory within a time period less than a threshold value.

14. The device of claim 9, wherein the information on one or more services offered on the wireless network comprises one or more hash functions which identify one or more services offered on the wireless network.

15. The device of claim 14, wherein the one or more hash functions comprise a hash function based, at least in part, on an address of a server offering the service on the wireless network.

16. The device of claim 9, wherein the monitoring of the messages is performed passively without a direct interaction between the access point and other access points or other wireless devices.

17. A wireless communications device configured to act as an access point, the device comprising:
- means for collecting information regarding one or more services offered on the wireless network, the information being collected from messages transmitted between other access points and wireless devices;
- means for storing in a memory a service description for the services offered on the wireless network based on the collected information;
- means for receiving a first service query from a wireless device for services before the wireless device associating with the wireless network;
- means for transmitting, if the service description is contained within the memory, the service description from the memory to the wireless device indicating availability of the service in the wireless network; and
- means for transmitting a multicast advertising message, the advertising message containing the collected information on one or more services offered on the wireless network, the advertising message further configured to allow wireless devices to determine which services are offered on the network prior to associating with the wireless network.

18. The device of claim 17, further comprising:
- means for transmitting a response to the wireless device indicating a wait time if the service description is not contained within the memory; and
- means for sending a second service query to the network, based on the received first service query.

19. The device of claim 18, wherein the second service query is a multicast service query.

20. The device of claim 18, further comprising:
- means for receiving a response to the second service query, the response containing a received service description which is the same or related to the service description provided in the first service query; and
- means for transmitting, after the wait time, the received service description to the wireless device indicating availability of the service in the wireless network.

21. The device of claim 17, wherein transmitting the service description from the memory to the wireless device is further conditioned on whether the service description has been updated in the memory within a time period less than a threshold value.

22. The device of claim 17, wherein the information on one or more services offered on the wireless network comprises one or more hash functions which identify one or more services offered on the wireless network.

23. The device of claim 22, wherein the one or more hash functions comprise a hash function based, at least in part, on an address of a server offering the service on the wireless network.

24. The device of claim 17, wherein the monitoring of the messages is performed passively without a direct interaction between the access point and other access points or other wireless devices.

25. A non-transitory computer storage that stores executable program instructions that direct a wireless communications device to perform a process that comprises:
- collecting information regarding one or more services offered on the wireless network, the information being collected from messages transmitted between other access points and wireless devices;
- storing in a memory a service description for the services offered on the wireless network based on the collected information;
- receiving a first service query from a wireless device for services before the wireless device associating with the wireless network;
- if the service description is contained within the memory, transmitting the service description from the memory to the wireless device indicating availability of the service in the wireless network; and
- transmitting a multicast advertising message, the advertising message containing the collected information on one or more services offered on the wireless network, the advertising message further configured to allow wireless devices to determine which services are offered on the network prior to associating with the wireless network.

26. The non-transitory computer storage of claim 25 further comprising:
- if the service description is not contained within the memory, transmitting a response to the wireless device indicating a wait time; and
- sending a second service query to the network, based on the received first service query.

27. The non-transitory computer storage of claim 26, further comprising:
- receiving a response to the second service query, the response containing a received service description which is the same or related to the service description provided in the first service query; and
- after the wait time, transmitting the received service description to the wireless device indicating availability of the service in the wireless network.

* * * * *